(12) United States Patent  (10) Patent No.: US 8,696,267 B2
Khurana  (45) Date of Patent: Apr. 15, 2014

(54) DRILL/COUNTERSINK ASSEMBLY AND METHOD FOR PRODUCING COUNTERSUNK HOLES

(71) Applicant: Sudershan K Khurana, Marietta, GA (US)

(72) Inventor: Sudershan K Khurana, Marietta, GA (US)

( * ) Notice: Subject to any disclaimer, the term of this patent is extended or adjusted under 35 U.S.C. 154(b) by 0 days.

(21) Appl. No.: 14/077,615

(22) Filed: Nov. 12, 2013

(65) Prior Publication Data

US 2014/0072380 A1 Mar. 13, 2014

Related U.S. Application Data

(63) Continuation-in-part of application No. 12/973,806, filed on Dec. 20, 2010, now Pat. No. 8,651,776.

(51) Int. Cl.
*B23B 47/00* (2006.01)

(52) U.S. Cl.
USPC ............. 408/67; 408/110; 408/202; 408/229; 408/239 R; 408/241 S; 279/76

(58) Field of Classification Search
USPC ....... 408/67, 110, 229, 239 R, 241 S; 279/76, 279/79, 102, 143, 145
IPC ...................................................... B23B 47/00
See application file for complete search history.

(56) References Cited

U.S. PATENT DOCUMENTS

| | | | | |
|---|---|---|---|---|
| 2,710,549 A | * | 6/1955 | Cogsdill | 408/112 |
| 2,937,544 A | * | 5/1960 | Forgy et al. | 408/112 |
| 2,990,024 A | * | 6/1961 | Van Allsburg | 175/211 |
| 3,907,452 A | * | 9/1975 | Tripp | 408/56 |
| 3,935,762 A | * | 2/1976 | Tudisco | 81/177.85 |
| 4,006,996 A | * | 2/1977 | Kasabian | 408/239 A |
| 4,096,896 A | * | 6/1978 | Engel | 81/121.1 |
| 4,115,017 A | * | 9/1978 | Wilhelmsson | 408/14 |
| 4,404,874 A | * | 9/1983 | Lieser | 81/438 |
| 4,752,161 A | * | 6/1988 | Hill | 408/67 |
| 4,950,109 A | * | 8/1990 | Dettinger | 408/82 |
| 5,096,342 A | * | 3/1992 | Blankenship et al. | 408/112 |
| 5,213,347 A | * | 5/1993 | Rulon et al. | 279/102 |
| 5,253,961 A | * | 10/1993 | Geissler | 408/58 |
| 5,743,683 A | * | 4/1998 | Skaggs | 408/97 |
| 5,863,161 A | * | 1/1999 | Tayne et al. | 408/224 |
| 6,394,940 B1 | * | 5/2002 | Sugata et al. | 483/13 |
| 6,471,450 B1 | * | 10/2002 | Mercier | 408/1 R |
| 6,491,057 B1 | * | 12/2002 | Collins | 137/318 |
| 7,607,207 B2 | * | 10/2009 | Buttau et al. | 29/447 |
| 7,607,871 B1 | * | 10/2009 | Nelson | 408/113 |
| 8,025,467 B2 | * | 9/2011 | Astorga Ramirez et al. | 408/95 |
| 8,118,520 B2 | * | 2/2012 | Hintze et al. | 408/67 |
| 8,337,124 B2 | * | 12/2012 | Nguyen | 408/1 R |
| 2008/0240877 A1 | * | 10/2008 | Kirby | 408/58 |

FOREIGN PATENT DOCUMENTS

JP 54073381 A * 6/1979 ............ B23Q 11/02

* cited by examiner

*Primary Examiner* — Eric A Gates

(57) ABSTRACT

A countersink cutter or drill/countersink combination or similar rotary cutter or assembly for drilling/countersinking or performing similar cutting operation to precise depths in various applications, including aerospace applications, uses a pneumatically driven pistol grip motor attached to a tool assembly or countersink tool assembly. The countersink tool assembly, which has a multi-fluted cutter, is coupled to and is coaxial with the spindle. The cutter can be preset to a precise depth at the back end of assembly through the slot or using gage stops on the guide rods fastened to brackets by setting the gage between gage stops and the bracket.

6 Claims, 9 Drawing Sheets

FIG. 2 EXPLODED VIEW

FIG. 3  REAR SUBASSEMBLY

DRILL/COUNTERSINK ASSEMBLY AND METHOD FOR PRODUCING COUNTERSUNK HOLES

This application claims priority, considered as "Continuation-in-part" application pursuant to prior utility application Ser. No. 12/973,806 filed on Dec. 20, 2012 and attached Form PTO/SB/130 (07-09) which are incorporated by reference. Also attached are Forms PTO/SB-28, PTO/AIA-14, PTO/AIA-015, PTO/SB-15A and PTO/AIA-01.

BACKGROUND

A countersink operation may be accomplished using microstops that may need frequent adjustment. In some processes, cylindrical holes are drilled in to a substrate, e.g. Non-metallic material, like composite or metallic material, like aluminum and titanium and then countersinking a hole using a countersink tool secured in the spindle of microstop. During this countersink operation, the pilot of the Countersink (that has a frusto conical shaped cutting member with cutting edges), is inserted in to microstop spindle with threaded hole and motor is turned on. The microstop can require multiple adjustments as the tool is used over time as the pin that slides in notch of the sleeve, rides over the threads, thereby losing the setting of the microstop. Also, because of threaded design of cutter and a conical seat, the exact position of cutter, when seated is completely unpredictable. This requires frequent setting up of microstop every time when cutter is replaced. Many times drill countersink combination tools have been used unsuccessfully to drill and countersink to predetermined depths. There have been many took developed for specific needs that are very sophisticated and use hydraulics, pneumatics and electronics, etc. Such took may be generally cumbersome and heavy and difficult to use.

Usually, the inspection of holes is done on test panels placed on work benches near production area. This adjustment and checking of countersink depth several times before starting on production panels requires manpower and time. The depth of countersunk hole should be checked after every few holes during production to ensure more consistent countersink depth. When the cutter is replaced, the position of cutting edge is usually not as the same position in relation to the front surface of the microstop and hence further adjustments of the microstop may be necessary.

Accordingly, there is always a need for an improved device to drill/countersink or counterbore or any such combination of such rotary cutting operations, assembly and method. It is to these needs, among others, that this disclosure is directed.

SUMMARY

This disclosure includes a drill/countersink assembly adapted to be attached to a drill motor for drilling and countersinking a hole in a workpiece. The assembly has (a) an approximately cylindrical rear subassembly extending between a first end and a second opposed end and (b) an approximately cylindrical front subassembly having a main body, a coaxial spindle with a spindle shaft. The subassembly moves laterally in relation to a rear subassembly. An approximately cylindrical drill/countersink or counterbore or marking/engraving cutter, operably connected to the drill motor, has the coaxial spindle having a bore to accommodate a cutter shaft, a nose piece, and the cutting edges. For the purpose of this invention, this disclosure is not limited to drilling/countersinking operation but here the cutter can be any rotary tool such as drill, countersink, counterbore, marking, engraving, milling or similar tool with combinations thereof such as drill/countersink tool or drill/countersink/counterbore tool or any rotary tool that can be designed to achieve desired controlled depth results. In the following pages, wherever countersink is mentioned, it should be considered as any of the above mentioned cutting operation that requires a controlled depth operation.

DETAILED DESCRIPTION

This disclosure is directed towards a countersink cutter, and a countersink assembly for countersinking that can be used to cut holes to precise depths in various applications, including aerospace applications, using a pneumatically driven pistol grip motor attached to a countersink tool. The countersink tool assembly, which has a multi-fluted cutter, can be coupled to and is coaxial with the coaxial spindle. The cutter can be preset to a precise depth at the back end of assembly through the slot or using gage stops on the alignment rods using a gage. The setting of the countersink tool assembly can remain relatively constant even when a cutter is replaced by another new cutter or another used cutter. In addition, the cutter has a quick change mechanism in which a slot shaft of the cutter is coupled to the spindle coaxially through cam action provided inside a bore concentrically where the cutter is secured to the spindle and drives it. Similar rotary took such as drills, screw drivers, counterbores and the like are rendered useable with the adapting mechanism and providing concentricity and torque because of cam action provided by the spindle and the cutter shaft surfaces. This principle of setting up the depth from the back end of tool and a quick change concept of assembly tool for cutter replacement or even using a standard threaded shank cutting tool that is used in current practices; and quick change features of the cutter and spindle engagement described in detail on the following pages or similar design like a slotted shank on cutter shaft and a pin driver on spindle or a cutter shaft with indentations to accept balls that are encased between a sleeve (mounted on the spindle body) inside diameter and outside diameter of spindle body or a cutter with varying number of flats on the periphery and a groove on the cutter shaft to accept balls that are encased between a sleeve (mounted on the spindle body) inside diameter and outside diameter of spindle body and same number of flats inside the spindle hole to accept cutter shaft; including tools other than countersink cutter replacement can be very conveniently adapted to pneumatically driven right angle power tools and stationary machines and other machines where the machine has movable spindle heads such as gantry heads on a stationary machine.

Figure 1:
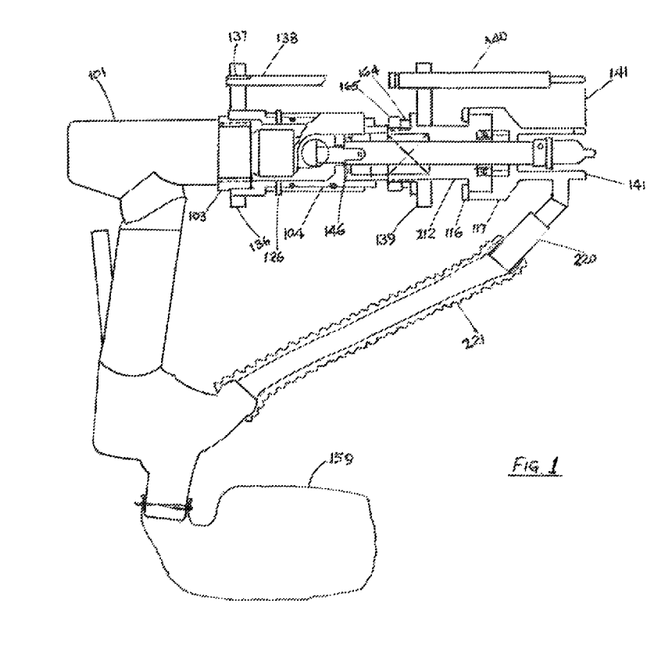
FIG. 1 shows one embodiment of the assembly of the power tool consisting of a front and a rear subassembly along with a cutter and a vacuum hose and a subassembly of a front and a rear bracket connected together with alignment rods; alignment rods fastened to one of the two brackets and with the gage stops mounted on it near the second bracket, a speed controller when mounted facing backwards, that also can work as a stabilizer when mounted facing forward.

One embodiment includes a countersink assembly adapted to be attached to a drill motor for drilling and countersinking a hole in a workpiece. As shown in HG, 1, the assembly has an approximately cylindrical rear subassembly (stationary) extending between a first end and a second opposed end and having a slot for a gage. The outer diameter of the assembly defines an approximate cylinder. The rear subassembly is mounted on the drill motor with an adaptor sleeve; the assembly also has an approximate cylindrical front assembly having a main body, a coaxial spindle with a spindle shaft. The front assembly moves laterally in relation to the rear subassembly. An approximately cylindrical countersink cutter operably connected to the drill motor, having a coaxial spindle having a bore to accommodate a cutter shaft, a nose piece, and having multiple cutting edges. The spindle shaft mounts into the drill motor. The rear bracket having two guide rods secured to it is mounted on the stationary rear assembly. The guide rods equipped, with gage stops on it, slide through the holes on front bracket having speed controller secured to it, and the front bracket is mounted on the front moveable subassembly.

The cutter shaft has a flat front end and a flat back end along a longitudinal axis, an angular flat surface, and a groove accommodates an O-ring. The front end of the cutter shaft coincides with the back end of the body diameter of the cutter. The angular flat surface locks into a pin of the spindle; and the intersection of the longitudinal axis and the cutting edges, when projected on to the longitudinal axis, is held in alignment at a substantially constant from the back end surface of the cutter. The distance between the spindle front surface and the front surface of the nose piece are constant and equal to the distance between the back end flat surface and the center of the radius between the tangent of a pilot diameter and the cutting edges, or the distance between inside surface of hole of spindle (563) and the front surface of said nose piece adding to it the horizontal distance between the center of radius (567) and the intersection point (566) along the axis is equal to the distance from the back end of cutter (565) to the intersection point (566) of the cutting edges when projected on the horizontal axis. In case of different design cutter, for example, end milling, engraving or marking cutter, the distance from the back end of cutter (565) to the front cutting point or edge of cutter is equal to the distance from inside surface (563) of the hole of spindle to the front surface of nose piece or alternatively, the distance from the surface (556) to the front cutting edge or point of the cutter is equal to the distance from the front surface of spindle (557) to the front surface of nose piece.

Main Assembly

Figure 1A:
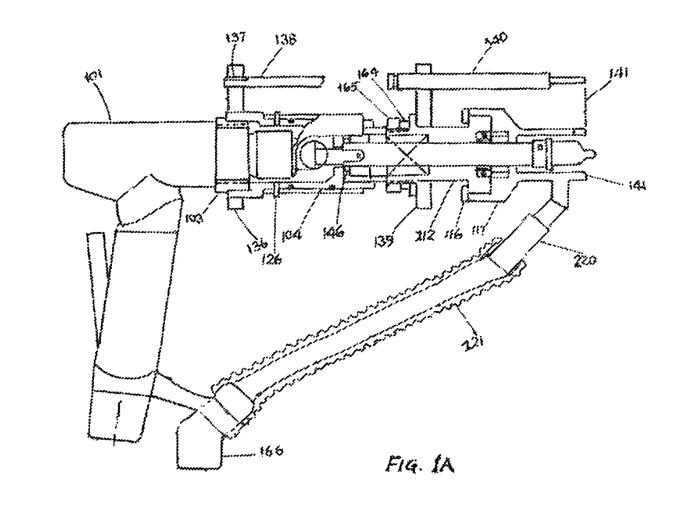
FIG. 1A shows complete assembly of power tool as described above, along with vacuum hose connected to the fitting (166) that is connected to the external source of vacuum for collection of debris.
Figure 3:
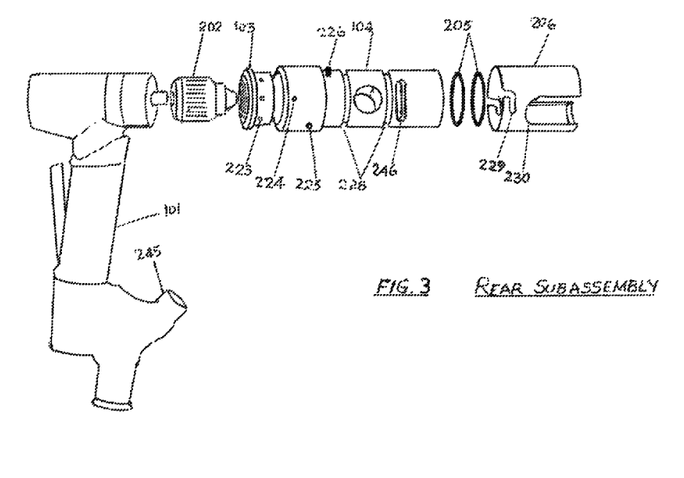
FIG. 3 shows an exploded view of the rear subassembly with a power tool, shown in FIG. 1 with a three jaw chuck, an adapter sleeve, an adapter and a vacuum sleeve.
Figure 4:
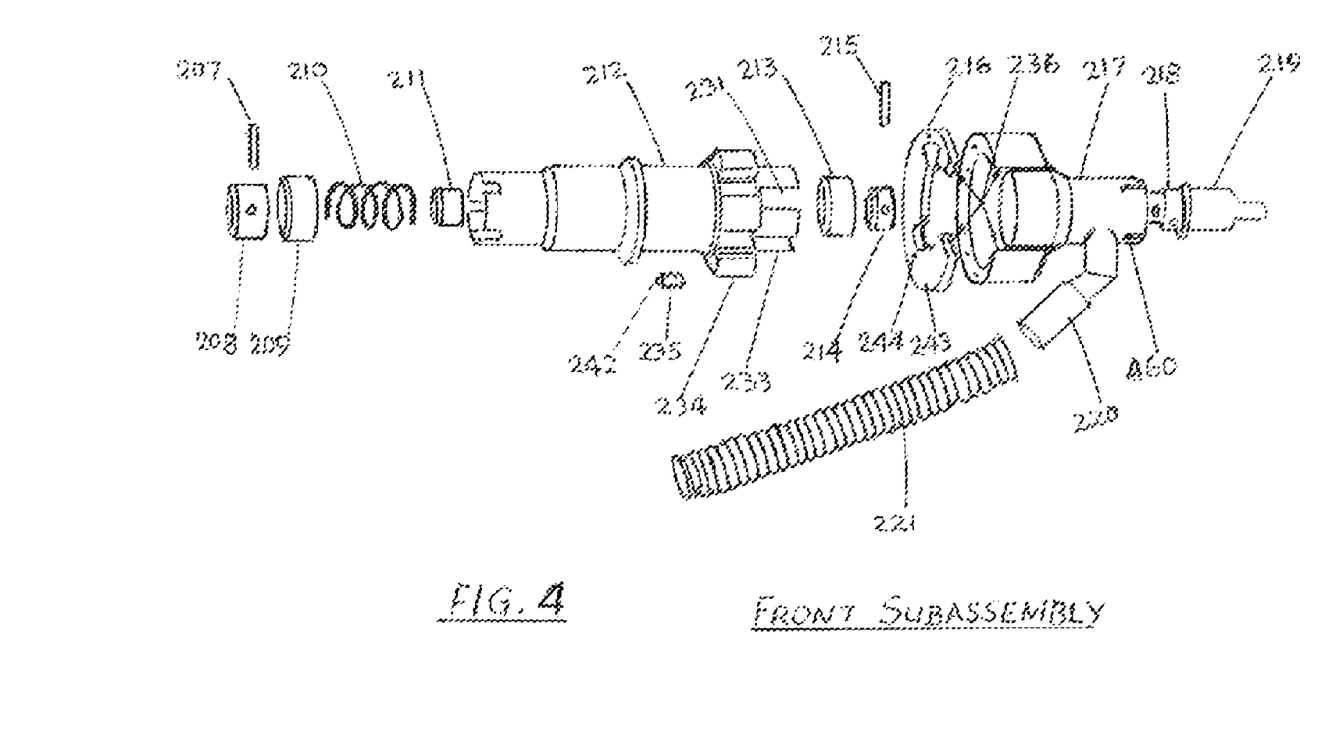
FIG. 4 shows an exploded view of the front subassembly consisting of a main body, a guide plate, a nose piece, a coaxial spindle with the cutter and the details inside an adapter of a nose piece along with the vacuum hose.

Referring to FIG. 1, it consists of the rear subassembly as shown in detail in FIG. 3 attached to the drill motor (101) and the front subassembly as shown in detail in FIG. 4 along with a subassembly of front bracket (139) and rear bracket (136) assembled together using alignment rods (138) secured with screws on rear bracket (136), and speed control device or stop (140) when used with gage (222). This assembly further consists of a vacuum hose (121) which is connected to the external vacuum system through fitting (166) as shown in FIG. 1A

Figure 2:
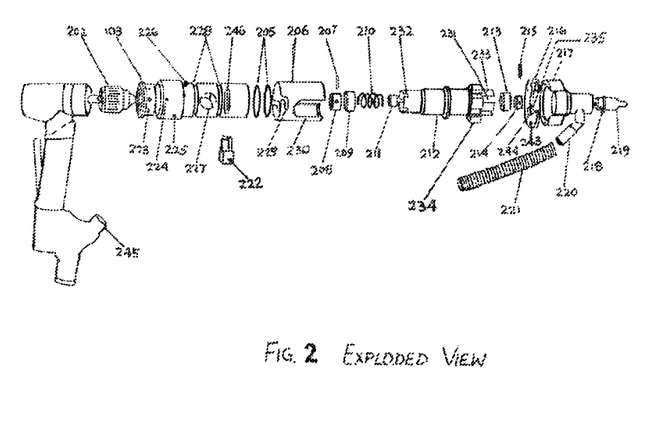
FIG. 2 shows an exploded view of the complete assembly shown in FIG. 1 of the countersink power tool consisting front (moveable) and rear (stationary) subassemblies.

Referring to FIG. 2, the rear subassembly consists of a pistol grip motor 101 (also called spindle motor 101) has a Jacobs chuck 202 secured to it. This chuck can also be substituted by colleting arrangement for securing the spindle 218. The adapter sleeve 103 that has internal threads circumferentially is mounted on to the motor 101 via threads after sliding over the chuck 202. The adapter housing 104 is attached to the pistol grip motor 101 sliding over the adapter sleeve 103 that has six indentations 223 at about 60 degrees apart on its outer diameter to engage with adapter housing 104 with three threaded holes 224 at about 120 degrees apart to accommodate three set screws. These set screws are aligned with the indentations on adapter sleeve 103 and can be tightened so that the front subassembly (shown later in FIG. 3) can be adjusted and secured to rear subassembly FIG. 2 to suit, e.g., an airplane stricture, and allow ease of handling for the mechanic so that the vacuum hose does not interfere with workpiece or other surrounding structure. The holes 225 at about 180 degrees are provided to loosen the adapter housing 104 from its sleeve adapter 103. The adapter housing 104 also has two pins 226, around periphery about 180 degrees apart pressed fit into the outer body diameter of adapter housing 104. These pins 226 are used to engage a vacuum sleeve 206 for vacuum purposes. Once the adapter housing 104 is secured to the motor 101 via adapter sleeve 103, the position of a chuck key an access hole 227 is such that chuck is exposed through hole 227 from where the chuck key is inserted to attach the coaxial spindle 218 to the chuck 202. There are two O-ring grooves 228 one on each side of a thru hole 227 on the outer diameter of adapter housing 104.

Two O-rings 205 are mounted in to the grooves 228 for sealing purposes. The vacuum sleeve 206 has two right angled cutouts 229 on the edge of vacuum sleeve 206, about 180 degrees apart from each other and two U-shaped cutouts 230 also 180 degrees apart, on the circumference of the vacuum sleeve. The positioning of U-shaped cutouts 230 in relation to L-shaped cutouts 229 is such that when the vacuum sleeve is aligned with the pins 226 on the adapter housing and turned to the locked position, chuck key access hole 227 is completely enclosed in the vacuum sleeve 206 and the adapter housing 104 is fully sealed. The vacuum sleeve 206 can be fully seated over the adapter housing 104 in sealed condition. A two piece split type rear mounting bracket 136 is mounted on to the front of the adapter housing 104 using two screws. Two guide rods 138 are slid into two holes in bracket 136 with flat end 137 into holes and damped with two set screws. These guide rods 138 provide guidance to the front subassembly (FIG. 3) assembled with the rear subassembly (FIG. 2) that helps the front assembly move in lateral direction without causing the subassemblies to rotate with respect to each other. This completes the rear subassembly as shown in FIG. 2.

Referring to FIG. 4, the front subassembly that is moveable in relation to the rear subassembly, consists of a main body 212 on one side that faces the countersink tool, and accepts the radial bearing 213 in to the bore for sliding fit and a bronze collar stop 214. The coaxial spindle is then inserted from the right side (as shown) through the collar stop 214, through a radial bearing 213, and through the main body 212 until it stops against the collar stop 214. At that time, a dowel pin 215 is aligned with the hole in the collar stop 214 and the hole in coaxial spindle 218 and pressed into the collar stop 214 and the coaxial spindle 218 through the rectangular cutout 231 until it is flush with the collar stop on the opposite side. The rectangular cutout 231 is provided for allowing the pin 215 to be inserted into the collar stop 214 and the coaxial spindle 218. Now a bronze bushing 211 of any length is slid over the coaxial spindle 218 on the opposite end of the main body where the spindle is already protruding out through the main body 212. A spring 210 is slid over the bronze bushing 211. The bronze bushing 211 inside diameter is made to slide fit over the axial spindle 218 and outside diameter of the bushing 211 is made to slide inside the spring 210. This bushing provides a support to the spring, acts as a stop and guides it so the spring 210 does not buckle or bend during the countersink operation avoiding any interference between the any two wires of spring 210 and causing early failure of the device or subassembly. It also provides a bearing surface to spindle 218. Then a radial bearing 209 is inserted on the spindle 218 that is already protruding out of the main body 212, collar stop 208 is inserted on the spindle. The pin 207 is pressed into the hole through the U-shaped slots 232 of the main body 212, collar stop 208 and simultaneously through the hole in axial spindle 218 after aligning the holes in collar stop 208 and coaxial spindle 218. The positioning of U-shaped slots 232 are such that it provides space for pin 207 to be inserted, and all these components are mounted on the axial spindle 218 in to the bore of the main body 212. In this case, the collar stop 208 may require some force to push the radial bearing 209 into the open end of the main body until the holes in the collar stop 208 and coaxial spindle 218 are aligned. Three ball plungers 235 are screwed into three tapped hole into the main body 212 facing balls towards the rear side towards the motor 101 in such a way that all three balls 242 that are part of ball plungers 235 are in one plane perpendicular to the horizontal axis. The ball plungers 235 are adjusted to a preset tension. The countersink cutter 219 is screwed into the axial spindle 218 and secured firmly as shown in FIG. 4. The guide plate 216 is attached to the nose piece 217 using two dowel pins and with two screws for alignment. The ball plungers 235 that are adjusted to a preset tension in such a fashion, when subassembly of nose piece 217 and a guide plate 216 is inserted into the main body 212 and turned, the nose piece 217 and guide plate 216, subassembly snap into a locked position.

The locking action can take place because there are three small holes 243 in the back side of guide plate 216. The three balls 242 snap into three holes 243 in the back side of guide plate 216. There is also a stop pin 244 in the back side of the guide plate 216. When the nose piece 217 and guide plate 216 subassembly are turned for locking action, stop pin 244 provides the subassembly with a stop to avoid over travel. The nose piece 217 has three minuscule slots 460 near the front end. When a vacuum is applied at the time of countersinking operation, fresh air is sucked through these minuscule slots 460 at high speed and it expands inside the walls of nose piece 217 near the cutting edges of the cutter 219. The cool air hits the cutting edges of the cutter 219 there by keeping the cutter cool during the cutting operation and extends the life of the cutter. The nose piece 217 has a welded tubular attachment 220 on the front side of the nose. This tubular attachment 220 acts as conduit for the dust or chips to be sucked out during the countersink operation. The open end of this tubular attachment 220 is attached to one end of vacuum hose 221 and the other end of vacuum hose 221 is attached to external vacuum system through fitting (166) as shown in FIG. 1A.

The speed control device 140 can be mounted into the front mounting bracket 139 such that the front part of the piston of speed control device 140 is slightly beyond the front surface 141 of the nose piece 217 so as to provide a preloading effect on the piston before actual countersink operation starts to be used as a stabilizer and when mounted backwards facing towards rear bracket 136 to be used as a stop for depth control. An identification ring 164 is slid on to the main body 212 and secured by nut 165 by screwing on the main body threads. This identification ring 164 identifies the size of a fastener, the complete assembly is designed for, and for a particular fastener used for assembly purposes. Now this front subassembly (FIG. 4) consisting of main body 212 assembled with its components in it along with front mounting bracket 139, guide plate 216, nosepiece 217 with welded tubular attachment 220 and the vacuum hose 221 is ready to be installed in to the rear subassembly (FIG. 3) consisting of drill motor 101, the adapter sleeve 103, the adapter housing 104 with O-rings 205, and vacuum sleeve 206 along with rear mounting bracket 136 with guide rods 138.

The front subassembly (FIG. 4) can be installed in to the rear subassembly (FIG. 3) by inserting the front subassembly main body 212 into the adapter housing 104 and simultaneously the guide rods 138 inserted into holes provided in front mounting bracket 139 and also inserting the axial spindle 218 into the chuck 102. At this time, the gage 222 is inserted in the slot 246 of the adapter housing 104 and the rear subassembly (FIG. 2) and the front subassembly (FIG. 3) is pushed against the gage surface and held tight. The chuck 202 is tightened with the chuck key accessing through the hole 227 of adapter housing 104. Once the chuck 202 is tightened, the gage 222 is pulled out of the adapter housing 104 and stored away and the complete assembly is ready for countersink operation.

Countersink Cutter and Spindle Assembly

Figure 5A:
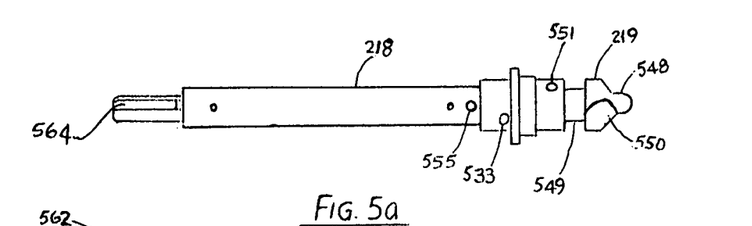
FIG. 5A shows one embodiment of the assembly having a cutter and a coaxial spindle.
Figure 5B:
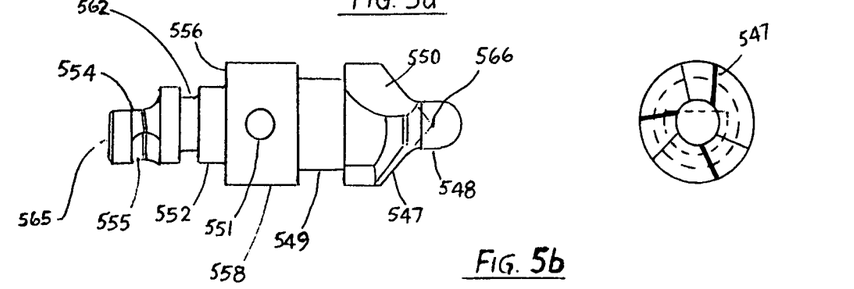
FIG. 5B shows a detailed view of the countersink cutter.
Figure 5C:
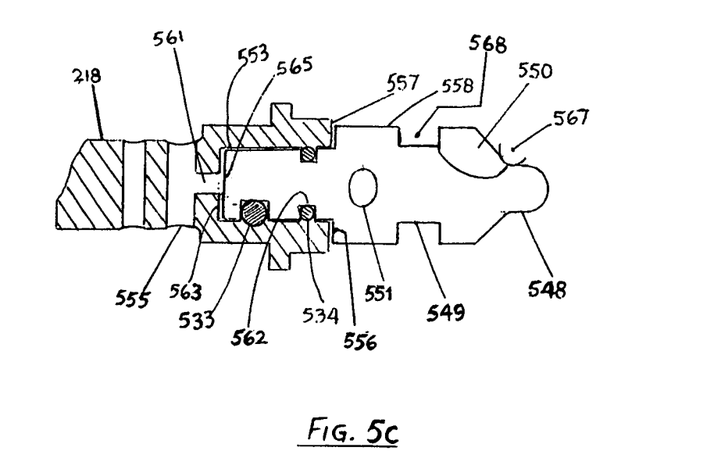
FIG. 5C shows a more detailed view of the countersink cutter and the coaxial spindle assembly as assembled.

FIG. 5 shows the assembly of the countersink cutter 219 with axial spindle 218. The countersink cutter 219 can have a cutting edge 547 at about 100 degree or about 130 degree which is an angle type of fastener used in aerospace industry or any other angle desired, and also has a pilot 548. The cutter 219 can have an outer body diameter knurled 558 so as to make it convenient to engage and disengage the cutter with the axial spindle 18 simply by holding the cutter 219 tightly by hand and turning it clockwise or counterclockwise as needed. The cutter 219 can have a cylindrical body with an undercut 549 area in such a location that the fluted area 550 merges into this undercut 549. This arrangement can allow composite dust or chips to flow through easily from fluted area to the undercut 549. The outer cylindrical body of the cutter 219 has a hole 551 to disengage the cutter 219, from the axial spindle 218 once it is assembled together.

The cutter shaft back end 565 can be flat and square in relation to the horizontal axis of the cutter 219. The surface 565 seats against the flat surface 563 in the bore of the axial spindle 218. When the cutter 219 with a square back end shaft surface 565 is assembled with spindle 218, the common contact surface 563 at the bottom of the bore of the spindle and 565 between the two becomes a reference surface for controlling the depth of countersunk hole. This common surface between 563 and 565 can provide the thrust in the direction of countersinking. The back end of cutter 219 can have a reduced cylindrical diameter 552 with another cylindrical groove 562 on the backend.

Figure 8:
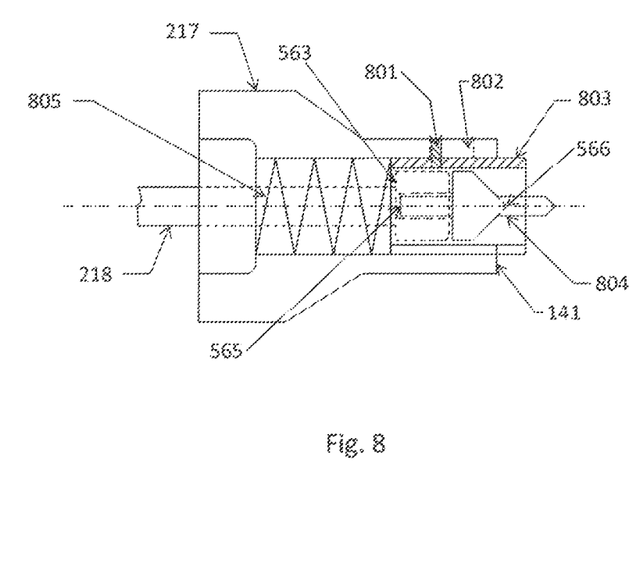
FIG. 8 shows detailed view of variation of nosepiece when used with drill countersink combination tool mounted on spindle where a spring loaded telescopic front end sleeve guided by a pin in slot machined in nosepiece. Figure does not show the nozzle on side for vacuum purposes.

This groove is made to suit an O-ring 534 that when assembled with axial spindle 218 would keep the cutter tight inside a bore, sometimes called counterbore 553 of the axial spindle 218, and resist the tendency of becoming loose in the bore 553. The back end of the cutter 219 also can have a flat 554 that lets the cutter 219 pass past the spindle locking pin 533 on the side of the spindle 218. There is a partial grove or a flat 555 made on the back end where the locking action between the axial spindle 218 and the cutter 219 takes place. This condition provides the torque for the cutting operation. The spindle 218 has the counterbore 553 on the front end (the same bore diameter 553 depending) on the shaft design to accept the shaft end of the cutter 219. There is a locking pin 533 across the cylindrical body diameter that is offset from the center of the spindle 218. At the bottom of the cylindrical bore 553, a small hole 561 is provided so that when cutter 219 along with O-ring 534 seated in to the groove 562 of cutter 219 is mounted into the bore 553, the air trapped in the space in bore is pushed out at the bottom and also to help remove the cutter 219 out of the cylindrical bore 553 since the pressure at both ends of the back end shaft and the front outside the bore 553 is about the same. The cutter shaft can also be of threaded design as it is customarily used today. FIG. 8 shows a drill/countersink cutter with threaded shaft. This cutter also maintains the same relationship of relative distance as explained above on page 9.

There can be another hole 555 that intersects the small hole 561. Hole 551 may help remove the cutter 219 out the spindle 218 by placing a pin through it and turning the cutter 219 counterclockwise and sliding out of the axial spindle 218. The back end of the axial spindle 218 has one or three flats 564 with knurls on them placed at about 120 degrees apart so that the chuck 102 jaws can grab on these flats 564. These knurls on the flats 564 provide resistance to avoid slippage between the jaws of the chuck 202 and flats 564 during the countersink operation. The back mounting cylindrical surface of the reduced diameter 552 of the cutter slips smoothly into the counterbore 553 of the spindle keeping the cutter symmetrical around the horizontal axis and concentric to the spindle 218 and the O-ring 534 provides slight interference between the bore 553 diameter of the axial spindle 218 and the O-ring 534.

Figure 6:
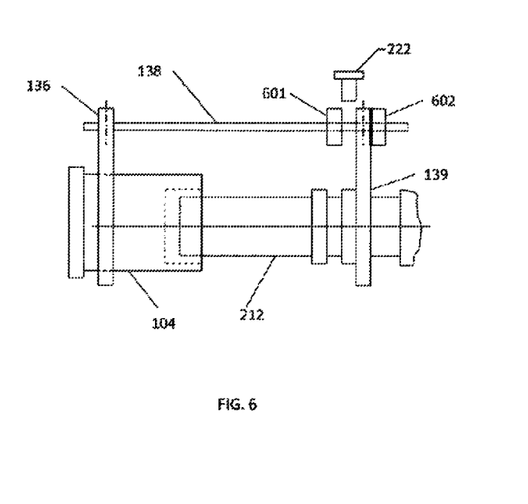
FIG. 6 shows a detailed view of part of the front and rear subassemblies consisting of brackets and alignment rods with gage stops and positioning of gage for setting depth of countersink.
Figure 7:
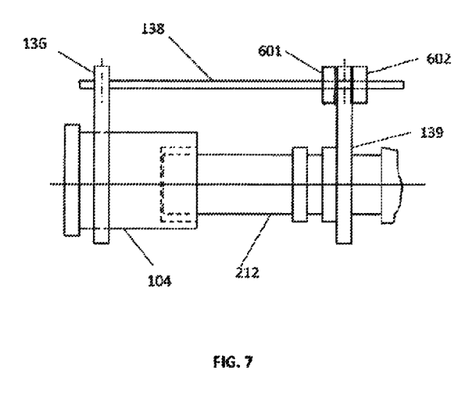
FIG. 7 shows a detailed view of part of the front and rear subassemblies consisting of bracket and alignment rods with gage stops at extended spindle position.

FIG. 6 and FIG. 7 show the securing of brackets 136 and 139 on the rear and front subassemblies in such a way that guide rods 138 are fastened to the rear bracket 136 and slide through the front bracket 139 for controlled lateral movement of front subassembly relative to the rear subassembly. An adjustable gage stop 601 and fixed gage stop 602 are mounted on one of the guide rods, one on each side of front bracket 139. The positioning of these gage stops is very important as explained on the following pages.

Operational Techniques

In use and application, a tool is designed to configure a predetermined hole profile in a machining operation to facilitate particular applications. The operator turns the motor on and aligns the pilot of the countersink cutter with the hole to be countersunk and inserts the power tool assembly and pushes the whole device until the main body bottoms out at the back end against the adapter housing where the gage has been used for setting up the tool. Once the tool has bottomed out, he removes the motor and works on the next hole. The hole can be countersunk to a desired depth that the tool has been set up for.

In one embodiment, a predetermined configuration hole profile can be prepared in a quick and efficient manner. The drilling, countersinking, counterboring, milling, engraving, marking or similar combination configuration of hole is achieved through the type of tool attached to the spindle or similar cutting or boring action of a tool may be performed by the cutting tool, such as a combination of a tool holder and a drill insert attached thereto. Typically the cutter engages the material to be cut upon relative rotation between the tool and the work piece.

Cutter Replacement in Assembly

The process of replacing the cutter 219 from the axial spindle 218 during the countersink operation involves holding the motor assembly in one hand, then first remove the hose 221 from the tubular attachment 220 of the nose piece 217 and using second hand the removal of subassembly of the guide plate 216 and the nose piece 217 by turning counterclockwise and sliding it out of the main body 212. The cutter 219 is exposed out of the front subassembly FIG. 3. A pin is inserted into the hole 555 of the axial spindle 218 holding it tight, and the cutter 219, while holding on the outer body, is turned counterclockwise and pulled out of the bore 553 of the spindle 218. If the cutter 219 cannot be turned by hand for removal purposes, another pin is inserted in hole 551 of the cutter 219, and turned counterclockwise while holding the pin inserted in hole 555 providing a torque to loosen the cutter and then pulled out of the bore 553 of the spindle 218. Once the cutter 219 is removed from the axial spindle 218, a new cutter is slid in to the bore 553 of the axial spindle 218 past the pin 533 until it bottoms out at the top of spindle 218 and then turned clockwise until it stops. The cutter 219 is in locked position and the subassembly of the guide plate 216 and the nose piece 217 is locked into position by inserting into the main body 212 and turning counterclockwise until it stops against the stop pin 244 of the guide plate 216. The hose 221 is connected to the tubular end 220 of the nose piece 217. The motor assembly is ready to be used again for countersink operation.

This magnetic design can be more suitable for composite and other non-metallic materials. One embodiment is countersink process and method for replacing a cutter using an assembly tool process to replace cutter without any consequential result of corrective action after completion of countersink operation. In one embodiment, the process of countersinking includes creating a countersunk hole by using the device designed for this purpose. More particularly, this embodiment can make use of the concept that the travel of spindle can be controlled by preset gaged distance prior to the countersink operation. The front subassembly can travel back laterally against the fixed rear subassembly without any rotational bodies touching each other.

Other Embodiments

In one embodiment, the cutter is made such that the relative distance between the intersection of the longitudinal axis and the cutting edges, when projected on to the longitudinal axis and the squared back end of the countersink cutter, is maintained accurately so that when cutter is replaced the cutting edges always fall at the same location in the tool assembly. In order to achieve the controlled depth of a drill and countersunk hole, this relationship of relative distance remains same for drill/countersink cutter combination as shown in FIG. 8 on page 45 and described on page 26 where as the drill length can vary based on the material thickness.

In another embodiment, the cutter's shaft back end can be at 90 degrees with respect to the longitudinal axis and is perfectly squared. This surface can be used as a reference surface for maintaining the length of cutter from the intersection of projecting the cutting surface and horizontal axis and the back end of the shaft for replacement purposes. The cutter's outer body diameter also has a squared back end and when it is assembled it has a little clearance between the spindle and the back end of the cutter body diameter.

In another embodiment, the relative distance between the front face of the nose piece of the front part of assembly and the front surface of the spindle is always the same.

In another embodiment, the cutter can be positioned such that the intersection of pilot's outer diametrical surface and the cutting edge of the countersink is in line with the front surface of the nose piece of the front part of assembly, when the motor is at rest and is not in use and it has not been set for any depth of cut, i.e., the back end of the main body and the front end of the adapter housing mounted on the pistol grip motor, touch each other and indicate that the reading of the countersink gage would be at zero or it also indicates that cutter's intersection of pilot's outer diametrical surface and the cutting edge of the countersink is on the same plane with the front part of tool assembly.

In another embodiment there can be threads on the back end of cutter and the axial spindle as normally done on standard cutters.

In another embodiment, the knurling can be on the outer body diameter of the cutter so as to engage and disengage cutter by holding the cutter tight by hand and turning it clockwise and counterclockwise to achieve the desire effect.

In another embodiment, a gaging system sets up the depth of countersink by use of flat gage through the tool assembly and still getting the same results even when cutter is changed.

In another embodiment, the complete tool assembly with motor setup can be placed on work bench. There is less danger of getting the cutter damaged even during the idle times. This feature comes in very handy especially in the light of cutters that are manufactured with diamond blades bonded to it at the flutes since the diamond cutters are very expensive.

In another embodiment, the tool has small restrictions provided in front of the tool assembly where the cutting edges of the cutter are. At these restrictions, ambient air is sucked into the nose piece of the tool assembly. The sucking action of fresh air creates a void with strong negative pressure around these restrictions on the opposite sides of the walls where these restrictions are provided. The sucking action causes the ambient air to expand near the area of restrictions that is the place where the cutting edges of the cutter are, where the expansion of air takes place. This expansion of air causes the temperature to drop in the vicinity of the cutter cutting edges during the chip formation action or dust formation action due to the grinding of cutting edges against the abrasive composite surface. So, the cutter remains cool during cutting action.

In another embodiment, the chip breaker feature is provided on all edges staggered from previous cutting edges except the last cutting edge of the cutter. The cutting edge finally sweeps the countersunk surface giving a fine finish to the conical surface of the hole.

In another embodiment, the engage and disengagement of cutter with the axial spindle bore is made easier by providing the outer body diameter 558 that has the knurls on it for holding the cutter tight during assembly or disassembly.

In another embodiment, a vacuum at the nose piece can be included at the front part of the assembly. The pistol grip motor used has its own vacuum generating feature, but this is not enough when it is connected to tool assembly. Plenty of air is being sucked through the top part of tool assembly dissipating and leaking away through other areas of tool assembly and making the vacuum process ineffective. So in accordance with this embodiment, provision is made by sealing the openings at the top part of tool assembly by use of O-rings and a vacuum sleeve that seals the opening at the top part of tool assembly.

In another embodiment, the provision of two pins diametrically opposite to each other on top of adapter housing to engage the vacuum sleeve for vacuum purposes and sealing the assembly. "L" shaped cutouts are provided and are at a slight angle to let vacuum sleeve engage with pins tightly and keep the sleeve locked until it is removed when needed.

In another embodiment, a method of collection of debris, such as composite dust or metallic chips in to containers using external plant vacuum connected to this system at the fitting (166) as shown in FIG. 1A to increase the effectiveness of the vacuum system.

In another embodiment, a feed control for countersinking process is provided in the tool assembly by use of feed control device. This device takes over the operator's speed of countersinking process providing better countersunk surface quality and increases the life of cutter.

In another embodiment, the lateral movement of the front subassembly and the rear subassembly is guided by guide rods for smooth operation.

In another embodiment, window openings are provided in the main body of the tool assembly to access the roll pins for disassembly, if needed, that keep this device fastened together to each other.

In another embodiment, there is provided a tool assembly that mainly consists of two sub-assemblies—the front subassembly that moves along the longitudinal axis when the complete assembly is intact where as the rear subassembly that as stationary subassembly remains fastened to the drill motor held in hand when in use. The rear subassembly that is secured to the power drill motor mounted with a chuck or similar colleting device to secure spindle, a countersink bit attached to the axial spindle enclosed in a cylindrical part of the nose piece that has a vacuum tube welded to it, a vacuum hose—one end is attached to this exit end of the nose piece and the second end of the vacuum hose is attached to the exhaust end of the pistol grip motor.

In another embodiment, the rear subassembly part of the complete assembly consists of a pneumatically driven power drill motor, which has an adapter sleeve mounted on it using internal screw threads on adapter sleeve and outside diameter of this sleeve has six 60 degree apart and at a fixed distance from the front edge to accommodate three set screws to secure an adapter housing for the assembly. The outside diameter of adapter sleeve is concentric with the drill motor threads to minimize any misalignment when an adapter is slipped on the outside diameter of adapter sleeve. The adapter housing inside diameter is made to slip fit on the adapter sleeve outside diameter. This adapter housing has three threaded holes 120 degrees apart on its outer diameter at exact distance from edge to align and engage three indentations on adapter sleeve and provided to secure adapter housing on the adapter sleeve. The six holes provided on adapter sleeve provide rotational position variations to the adapter housing so the operator can align the front subassembly with the rest of work piece and surroundings. This adapter housing also has another two holes offset from previous three threaded holes. These holes are provided to engage or disengage adapter housing from adapter sleeve. Along with above features of adapter housing, two grooves are provided on the outside diameter of housing some distance apart. In between these two grooves two large diameter holes 180 degree apart are provided perpendicular to the longitudinal axis. These holes are provided to accommodate a chuck key for tightening the spindle and two grooves are provided to accommodate two O-rings. These O-rings are furnished so that when a vacuum sleeve is slipped on the adapter housing over these O-rings, vacuum sleeve provides means for sealing this captured area between O-rings.

Also another feature of this adapter housing is there is a provision of gage port also called slot so that a flat gage can be inserted through this for setting up the depth of countersink. The positioning of the two big opening in the adapter housing is such that chuck which is used for securing spindle is accessible.

In another embodiment, the adapter housing can have two small holes provided on the circumference of the outer diameter that accommodates two dowel pins located 180 degrees apart. These dowel pins are press fit in to these holes. The purpose of the dowel pins is to engage and disengage the vacuum sleeve when it is slipped on the adapter housing. After engaging these pins with two right angled cut outs 180 degrees apart made on the vacuum sleeve, the vacuum sleeve can then be locked to the adapter housing by turning the vacuum sleeve until it stops. The positions of the tracks or right angled cutouts on vacuum sleeve are in such a relation with the two dowel pins, that when sleeve is locked on the adapter housing, the two big openings for chuck key are enclosed totally inside the vacuum sleeve between two O-rings. This creates a completely sealed area to make vacuum action effective. Another feature of vacuum sleeve is that it has two u-shaped long slotted cutouts on its body in such a relationship with right angled cutout for dowel pins that when it is in disengagement position from adapter housing, the two opening for chuck insertion are exposed so that chuck key can be used to disengage the spindle for adjustment purposes. At this location when the U-shaped slots are exposed for spindle tightening, the vacuum sleeve is pushed back when dowel pins align with another set of small slots that are 90 degrees from L-shaped slots for making chuck easily accessible for chuck key. The u-shaped design also has another advantage that it provides access for the gage to be inserted in to the gage port for setting up the complete assembly for countersink process. The gage port that is provided on the adapter housing is aligned with the u-shaped opening in the vacuum sleeve and gage is inserted to make the complete setup ready for operation. While the countersink operation goes on and when the vacuum sleeve is in locked position, the gage port is then covered under the vacuum sleeve where there is no u-shaped opening. This prevents the dust or debris to get into gage port and keeps it clean.

Another feature of this embodiment is that a provision is made so that the back end of the gage port surface facing towards the motor provides the stop surface for the main body indicating completion of countersink depth desired. When no gage is inserted into the gage port and the back end of the main body touches the surface of the adapter house, this indicates zero setting of the cutter. The adapter housing also has a hole through its body in the center in longitudinal direction to accept the axial spindle.

In another embodiment, the adapter housing can have an inside diameter at the front of the adapter housing that provides the guidance to the front subassembly during the assembly of front subassembly to the rear subassembly. It is aligned so that rear subassembly provides the front subassembly the freedom to slide in and out of the rear subassembly during the countersink operation.

In another embodiment, the means for attaching the front subassembly to the rear subassembly include the drill motor subassembly comprises a main body that has back end such that it slides into the front end of the adapter housing of the rear subassembly. The back end of the main body also has four slotted openings. The purpose of these openings is to provide access to the roll pin that is pressed tightly into the diameter of the spindle crosswise to hold other components inside the main body, such as bronze bushings, radial bearing, spring etc. The access is provided so that front subassembly can be dismantled conveniently using a small hand punch manually. Another feature is the provision of a compression spring that helps bring the front assembly to the original position. Another feature of the main body is that it has three alignment lobes 234 built on it. These provide the means for alignment with the nose piece that is detachable from the front subassembly for the purpose of replacement of cutter. Another advantage of these lobes is that these provide room for installation of three ball plungers. These ball plungers are the means for securing the nose piece to the main body via a guide plate in between. The lobes 234 are the integral part of the main body but can be made as a separate part slip fitted on to the main body and held with set screws. This may provide a means to cut manufacturing cost. Another feature of the main body is the positioning of three lobes that provided only one way for insertion of main body into the nose piece via guide plate causing no confusion to operator as to how to locate lobes in relation to lobe opening cutouts 235 provided in the guide plate. The front part of the main body has four longitudinal slots that provide access to the roll pin that holds the shaft assembly together along with bearing inside the main body and bronze bushing. The front end of the main body also has a precision bore to accommodate a radial bearing that supports the axial spindle in the front assembly. The feature is depicted as a complete front sub assembly is held together by these two roll pins that are provided on two ends of the spindle. In between the two roll pins are bushings and bearings and spring. The radial bearings provided on both ends of the main body provide smooth rotational movement of spindle, remove misalignments in the front sub assembly and provided radial support; bronze bushings provide support to radial bearings and smooth operation of spindle.

In another embodiment, the main body can have an identification band that is slipped on to outside diameter and then secured with identification band retainer. This identification band provides the means of identifying what size fastener the setup is made for. Different colors are used to depict various sizes of holes diameter setup.

In another embodiment, the front subassembly is that a guide plate with specially designed openings (235) is provided to accommodate the lobes (234) of the main body. The guide plate allows the alignment between the two parts and there is provided a stop pin on the underside of the guide plate. This stop pin acts as a stop to prevent the main body for over traveling inside the nose piece when main body is engaged with nose piece. One more feature provided in the guide plate is that it has three small diameter holes for the ball plungers to rest when main body is secured to the nose piece. There, also are two male dowel pins pressed in the underside of the guide plate so that guide plate can be aligned with the nose piece and then secured with flat head screws.

In another embodiment, the front subassembly also comprises of the nose piece as has been mentioned earner. This nose piece has its own tubular weldments welded to the side for debris to be evacuated before it gets into the rest of mechanism. This tubular weldment is connected to one end of vacuum hose to carry all the debris out to a means of collection of debris. The second end is then connected to the exhaust end fitting (166) as shown in FIG. 1A. This exhaust end is connected to the external vacuum source. The nose piece has another feature at the front end that it is provided with three minuscule sized slots near the front end where the cutting edges are when cutter is in place. These slots act as cooling devices. When vacuum is applied during the cutting action, fresh air at ambient temperature is sucked in from these tiny slots. Air expands inside the walls of nose piece in and along the cutting edges of the cutter this expansion of air drops the temperature of the cutter when air hits on the cutting edges. This keeps the cutter cool and extends the life of cutter several times comparing to action where the situation when there is no cooling. This nose piece, FIG. 8 can be of various designs depending on the application. For instance, when the cutter is a drill that has a countersink built into it, like a drill countersink combination cutter 804, the nose piece can be of fixed design as in case of countersink cutter or of telescopic design that a front end of nose piece, called bushing 803, can be of retractable design, move inside the nosepiece without causing any blockage to the vacuum action. This front end of a bushing is spring 805 loaded behind it and entrapped in the nose piece to provide telescopic action. The travel of this front bushing is controlled by a sliding pin 801 that travels in the nosepiece body with a slot 802 built in the nose piece body to avoid turning of bushing during drilling action. Similarly, other nosepieces are designed specially to suit type of cutter being used.

In another embodiment, the nose piece has is that there is provision for cutout (236) in the front of nosepiece so that the operator can see the countersink bit, otherwise the outside diameter of the nose piece would block the sight and would not be easily able to insert the cutter tip in to the existing hole. This nose piece also has a bore drilled in to it to precisely accommodate the main body front end.

In another embodiment, the front part of subassembly is that a spindle and the cutter have a quick change mechanism for securing purposes. The spindle has a precision bore so that the cutter precision ground shaft diameter can slip into the bore providing the alignment between the spindle and the cutter with minimal radial play allowed depending upon the standard manufacturing practices. The spindle has a cross mounted pin inside slightly offset from the center of the spindle, so that the cutter can be inserted through one end past the pin and the cutter also has a flat at the shaft end to get past the pin. The cutter also has another feature, ground flats besides the previously mentioned flat on the shaft that can trap the pin in the spindle when the cutter is turned about thirty degrees. The tolerances are so close that there is no lateral play or radial play, there by securing the cutter in the spindle. The pin acts a driving member of the spindle when it trapped in between flats of the cutter. Another feature that is provided on the shaft end is that it has a groove to accommodate an O-ring on it. This O-ring on the shaft end, when it is inserted into the spindle bore, it keeps the cutter in place without any fear of losing the cutter if the motor is turned counterclockwise or otherwise cutter may slide out of spindle. Unless the operator decides to take out the cutter it would not come out because of sufficient resistance O-ring provides between the cutter and the spindle.

In another embodiment, there are two brackets mounted on the complete assembly, one bracket is secured to the main body of the front subassembly and the other bracket is secured to the fixed end of rear subassembly using socket head cap screws. These brackets are then mounted with two guide rods that are secured on the rear bracket on one end using set screws and slide back and forth on the other ends of guide rods in precision holes provided in the front bracket. These guide rods provide stability to the whole setup and allows smooth sliding operation even though the main body has its own feature that slides inside the adapter housing.

In another embodiment, FIG. 6 two guide rods are secured to the rear bracket 136 that (bracket) is fastened to body 104 and the guide rods slide through the front bracket 139. An adjustable gage stop 601 is mounted on the guide rod placed between the two brackets and another fixed gage stop 602 mounted on the guide rod outside the front bracket facing outwards. The adjustable gage stop 601 has a screw to fasten it to the guide rod. The gage 222 is inserted between the adjustable gage stop 601 and front bracket touching the gage on both sides and gage stop 601 is then secured to the guide rod and gage removed. A fixed gage stop 602 is moved against the other side of the front bracket touching the side and secured to the guide rod. The countersink tool is set for countersinking operation. However, the same effect can be achieved by reversing the securing of guide rods in the front bracket and sliding them through the rear bracket. In this situation, the adjustable gage stop 601 is moved closer to rear bracket, between the front and the rear brackets, at a distance equal to depth requirement by using the gage 222 and placing the fixed gage stop 602 next to rear bracket on the opposite side of the bracket.

In another embodiment, FIG. 7 once the adjustable gage stop 601 is set, as mentioned above, the whole front subassembly is moved towards the rear subassembly against the adjustable gage stop 601 so that the cutter is fully exposed for countersinking, then the fixed gage stop 602 is moved against the front bracket and secure this gage stop to the guide rod. This makes the countersink tool ready for countersinking with the cutter fully exposed to correct depth. Keeping cutter fully exposed can also be achieved when the guide rods are secured in the front bracket and slide through the rear bracket. In this case, the front assembly is pushed towards the rear bracket and the adjustable gage stop 601 is moved to touch the rear bracket and secured to the guide rod and also fixed gage stop 602 is placed on opposite side of rear bracket touching it and secured to guide rod thereby locking the position of the countersink tool fully exposed.

The front bracket also has another feature to accommodate a speed control and shock absorber device mounted of the front end. This device provides support and resistance that is adjustable on it, to the operator when he pushes the motor against the airplane structure or panel to countersink holes. The operator can adjust this resistance so it is not over bearing yet not be able to plunge the countersink tool in to the panel causing the damage to it. Speed control device may also include a pressure control knob that may be rotated to control the tension setting of surge control device, or in other words, to control the axial force required to move plunger relative to hydraulic cylinder. Increasing the tension setting of surge control device provides greater resistance against an axial force applied to countersink, and thus decreases the axial speed, or feed, at which countersink tool may travel during countersink operation. Likewise, decreasing the tension setting provides less resistance and increases the axial speed at which countersink may travel. The surge control tension setting may be selected based on one or more criteria, such as for example, the material properties and dimensions of the workpiece, the material properties and dimensions of countersink tool. It should be understood that surge control device may include additional hydraulic dampers or any other suitable means of controlling the axial speed, or feed, of cutting tool, such as, for example, springs or compressible materials.

In another embodiment, where the speed control device is mounted on the front bracket facing backwards or a long pin mounted to the front bracket facing backwards can also be used as a stop for depth control purposes using a gage 222 between the speed control device or the long pin and the rear bracket. In this case the long pin that is adjustable is secured to the front bracket. The same effect can also be achieved by getting the relative distance traveled to be controlled between the two subassemblies by having some kind of protrusion on one subassembly or a pin as explained above and stop against the other subassembly or mounting a similar pin or some kind of protrusion on both sides of subassemblies and travel in opposite directions to control the travel equal to the gage thickness.

In another embodiment, several component parts are designed in such a way these can be manufactured very economically or some even purchased of the shelf to make a complete assembly. The countersink cutter is specially made from materials that would be more suitable for application where it is going to be used on, for example, for composite material to be cut, the countersink material used on cutting edges is fine grade diamond blades, and for tough materials, the cutter is made from tungsten or molybdenum carbide. This carbide cutter can also be used on aluminum materials. Even high speed steel can be used for cutter for aluminum applications. But the most important part of the cutter is that it must be made extremely accurate with tight tolerances to achieve the correct results and make the power tool countersink assembly error proof.

From one perspective, a basic principle of setting up the tooling with a flat gage between the front and the rear assemblies and method of engaging and disengaging the front nose piece with main body can be utilized also right angle motors, in stationary machine tools to achieve the depth control of the drilling or countersinking operation or similar operation where a rotary cutting tool with a pilot or without a pilot is utilized. The cutter shaft design feature can also be made acceptable to other rotary tools such as drill and countersink combination tools, drills, counterbores, etc. it is understood that the tool can also be used in other industries beside aerospace industry where accurate and controlled depth of countersink is needed. Examples of other industry may be trucking industry where sheet metal containers are used for shipping. Air drag caused by protruded button head fasteners can be reduced by using flush head fasteners, thereby increasing the fuel efficiency.

The above detailed description of the embodiments, and the examples, are for illustrative purposes only and are not intended to limit the scope and spirit of the invention, and its equivalents, as defined by the appended claims. One skilled in the art will recognize that many variations can be made to the invention is closed in this specification without departing from the scope and spirit of the invention.

The invention claimed is:

1. A countersink or other rotary cutting tool assembly adapted to be attached to a drill motor for drilling and countersinking a hole or doing a similar operation in a workpiece, comprising: an approximately cylindrical rear subassembly extending between a first end and a second opposed end and having a slot for a gage, wherein the outer diameter of the assembly defines an approximate first cylinder, the rear subassembly is mounted to a drill motor with an adaptor sleeve; an approximate first cylindrical body has a through hole for providing access to a chuck for tightening purposes and has two O-ring grooves where two O-rings are mounted on; said rear subassembly also comprises a cylindrical vacuum sleeve that slides over the first cylindrical body with the O-rings mounted on it; an approximate cylinder front assembly having a main body, a coaxial spindle with a spindle shaft, wherein the front subassembly moves laterally in relation to said rear subassembly; the front subassembly also comprises a spring with a bushing inside it entrapped in said main body; having quick change mechanism for removal of a nosepiece subassembly; and said nosepiece connected to external source at the fitting for vacuuming debris; an approximately cylindrical countersink cutter, operably connected to said drill motor, said coaxial spindle having a pin inserted in a bore to accommodate a cutter shaft using a second quick change mechanism to engage, having a body diameter with knurls and a hole through, a pilot and a set of cutting edges, wherein said rear subassembly is stationary; said spindle shaft mounts into said drill motor; said cutter shaft has a flat front end surface or edge and a flat back end along a longitudinal axis, an angular flat surface, and has a groove to accommodate an O-ring; said front end surface or edge of said cutter shaft coincides with a back end of said body diameter of said cutter; said body diameter has said knurls on a cylindrical body diameter surface; an angular flat surface locks into said pin of said coaxial spindle; and an intersection point of the longitudinal axis and said cutting edges, when projected on to the longitudinal axis, is held in alignment at a substantially constant distance from the back end surface of said cutter; and the distance between a front surface of said coaxial spindle and the front surface of said nose piece is constant and is equal to the distance between said front end surface or edge of body diameter flat surface and the center of the radius when drawn between the tangent of said pilot diameter and said cutting edges or the distance between the spindle bore surface and the nose piece front surface are constant and is equal to the distance between the back flat surface and the center of the radius between the tangent of pilot diameter and the cutting edges plus longitudinal distance between said intersection point and said center of the radius; the front subassembly is set at a desired distance from the rear subassembly, locking the front assembly in place with the gage stops; a subassembly consisting of a rear bracket mounted on said stationary first cylindrical body, connected with an alignment rod with screws to a front bracket mounted on said main body; one of a speed controller, a long cylindrical pin or protrusions mounted on said front bracket facing towards said rear bracket adjusted to be used as a stop, said gage is used between said stop and said rear bracket for setting up the depth; a set of gage stops, one each adjustable and fixed respectively mounted on said guide rod, one on each side of said front bracket; a gage stop depth set by using either said gage between said adjustable gage stop and said front bracket and locking said adjustable gage stop and said fixed gage stop against said front bracket, or by moving said gage stops mounted on said guide rod, one on each side of said rear bracket where depth is set by using gage between adjustable gage stop and said rear bracket and locking said gage stops against said rear bracket; with said adjustable gage stop set in correct position, said front subassembly is moved towards said rear subassembly against said adjustable gage stop making said cutter fully exposed for countersinking, said fixed gage stop is secured against said front bracket touching it making the countersink tool ready with said cutter fully exposed to correct depth; keeping said cutter fully exposed is achieved when said guide rods are secured to said front bracket and slide through said rear bracket, said front assembly is pushed towards said rear bracket and said adjustable gage stop is moved to touch said rear bracket and secured to said guide rod and also fixed gage stop moved against rear bracket on outside of said bracket and secured to said guide rod thereby locking the position of said cutter fully exposed.

2. The assembly as claimed in claim 1, wherein said angular flat on said cutter shaft and said pin are inserted at an offset position from center through said bore of said coaxial spindle, and engage each other to create said first quick change mechanism for said cutter to be mounted and removed from said coaxial spindle and provide torque to said cutter.

3. The assembly as claimed in claim 1, wherein said cutter shaft is one of a threaded cutter shaft design, a quick change cutter mechanism with a slotted shank on said cutter shaft and a pin driver on said spindle, a cutter shaft with indentations to accept balls encased between a sleeve mounted on said spindle body inside diameter and outside diameter, or a cutter shaft with a varying number of flats on the periphery and a groove on said cutter shaft to accept balls that are encased between a sleeve mounted on said spindle body inside diameter and outside diameter and the same number of flats inside said spindle hole to accept said cutter shaft to provide torque.

4. The assembly as claimed in claim 1, wherein said nosepiece is a telescopic design where said front bushing is retractable and said spring is loaded and guided by said pin and said slot without hampering vacuum action and preventing said sleeve from turning during drilling action.

5. A method for adjusting a countersink or other rotary cutting tool assembly as claimed in claim 1, comprising: adjusting the front end of the cutter shaft to coincide with the back end of diameter of the cutter; locking the angular flat surface into a pin of the spindle; and holding the intersection point of the longitudinal axis and edges, when projected on to the longitudinal axis, in alignment at a substantially constant distance from the back surface of the cutter and equal to spindle bore surface and the nosepiece surface in assembly.

6. The method as claimed in claim 5, whereby adjusting said gage between said front subassembly and said rear subassembly, used between said gage stops and said brackets, achieves the depth control required for drilling or countersinking.

* * * * *